(12) United States Patent
Plamper

(10) Patent No.: US 6,419,035 B1
(45) Date of Patent: Jul. 16, 2002

(54) CLUTCH/BRAKE ASSEMBLY FOR VEHICLE

(75) Inventor: Gerhard Plamper, North Royalton, OH (US)

(73) Assignee: Plymar, Ltd., North Royalton, OH (US)

( * ) Notice: Subject to any disclaimer, the term of this patent is extended or adjusted under 35 U.S.C. 154(b) by 0 days.

(21) Appl. No.: 09/650,015

(22) Filed: Aug. 28, 2000

Related U.S. Application Data
(60) Provisional application No. 60/213,513, filed on Jun. 22, 2000.

(51) Int. Cl.[7] ............................................. B62D 11/08
(52) U.S. Cl. ...................................... 180/6.2; 192/13 R
(58) Field of Search ................................. 180/6.2, 6.26, 180/6.32, 6.36, 6.62; 192/12 R, 13 R, 13 A, 17 R

(56) References Cited

U.S. PATENT DOCUMENTS

| | | | |
|---|---|---|---|
| 3,581,600 A | * | 6/1971 | Holdeman .................. 180/6.2 |
| 4,572,310 A | * | 2/1986 | Peter ........................ 180/6.24 |
| 4,895,210 A | * | 1/1990 | Witzel ........................ 172/125 |
| 5,012,907 A | * | 5/1991 | Fujioka et al. ............... 180/6.2 |
| 5,427,217 A | * | 6/1995 | Patridge ...................... 180/6.2 |

* cited by examiner

*Primary Examiner*—Kevin Hurley
(74) *Attorney, Agent, or Firm*—Tarolli, Sundheim, Covell, Tummino & Szabo L.L.P.

(57) ABSTRACT

A clutch/brake assembly for a vehicle, such as a lawn tractor, includes left and right drums rotatable with left and right drive axles of the vehicle. The assembly is responsive to vehicle steering input to resist rotation of one drum and, thereby, to slow the drive wheel associated with the one drum. Further steering input provides braking capabilities. The assembly has no differential action. The housing for the assembly is a split housing having a plurality of bearing supports aligned along transverse axes. On each one of the split housing pieces, all the bearing support surfaces are finished simultaneously with one punching operation.

15 Claims, 12 Drawing Sheets

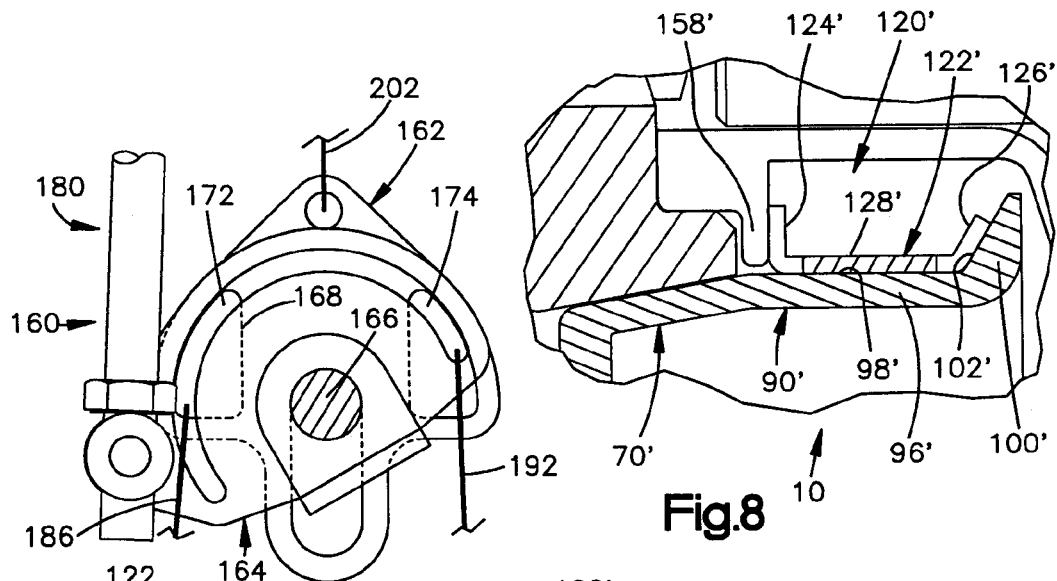
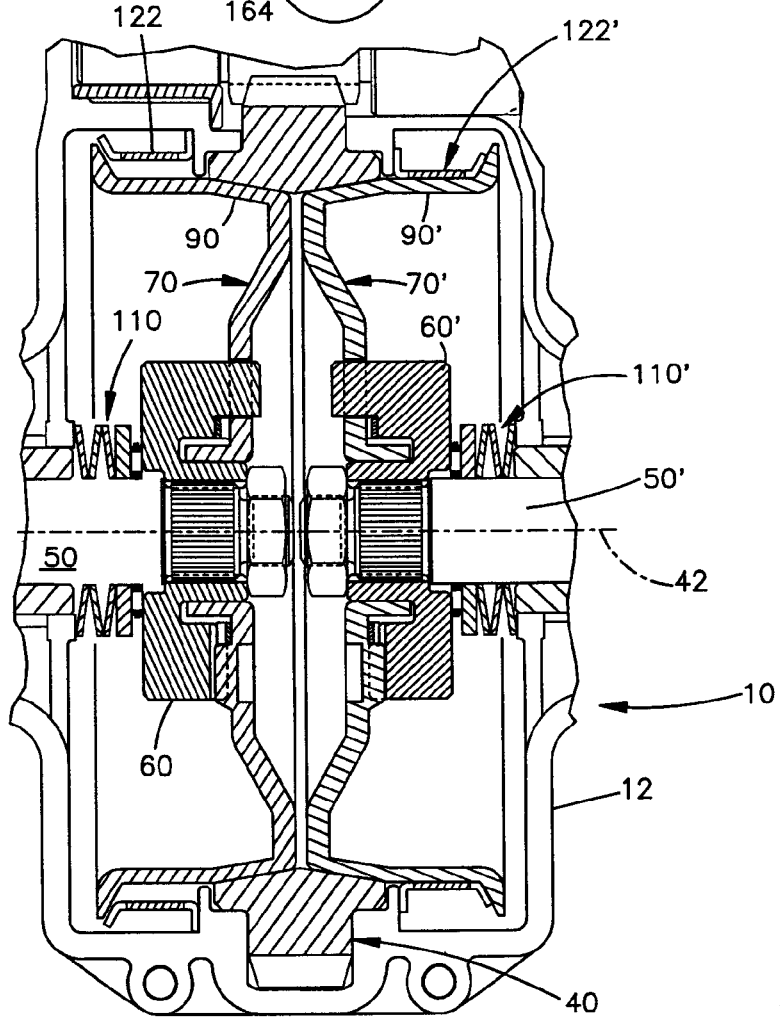
Fig.8
Fig.7

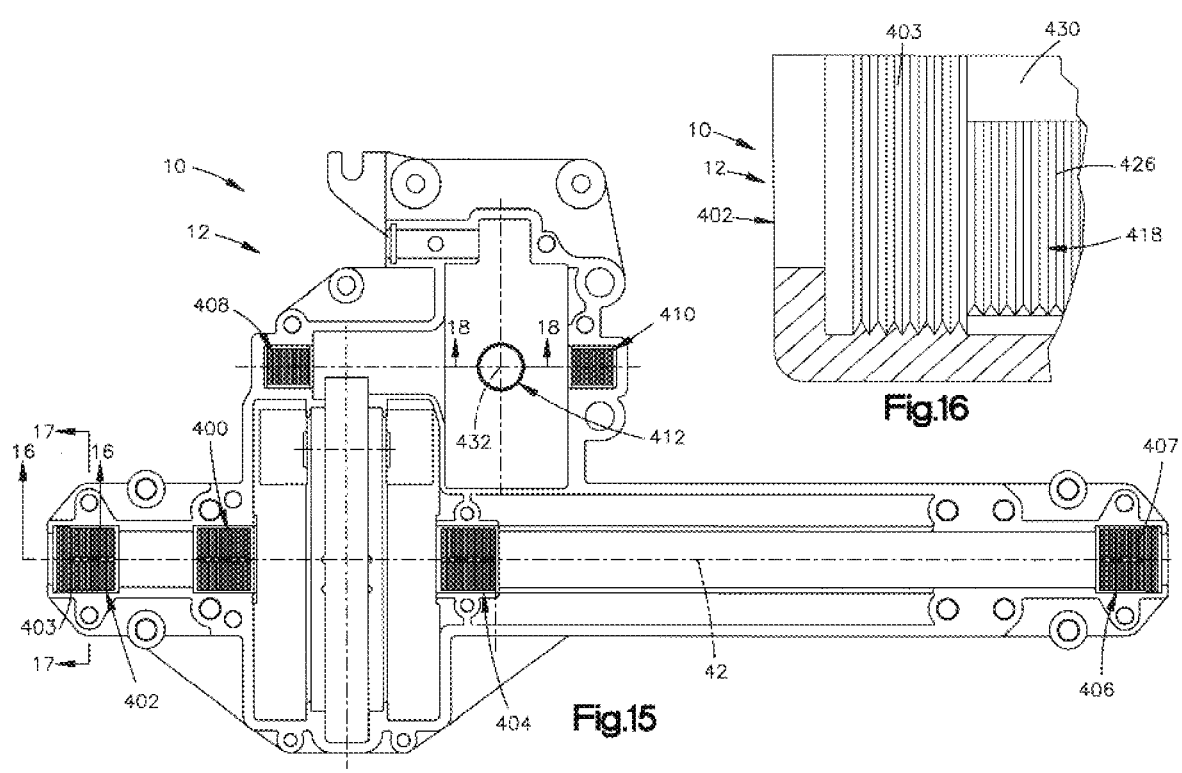

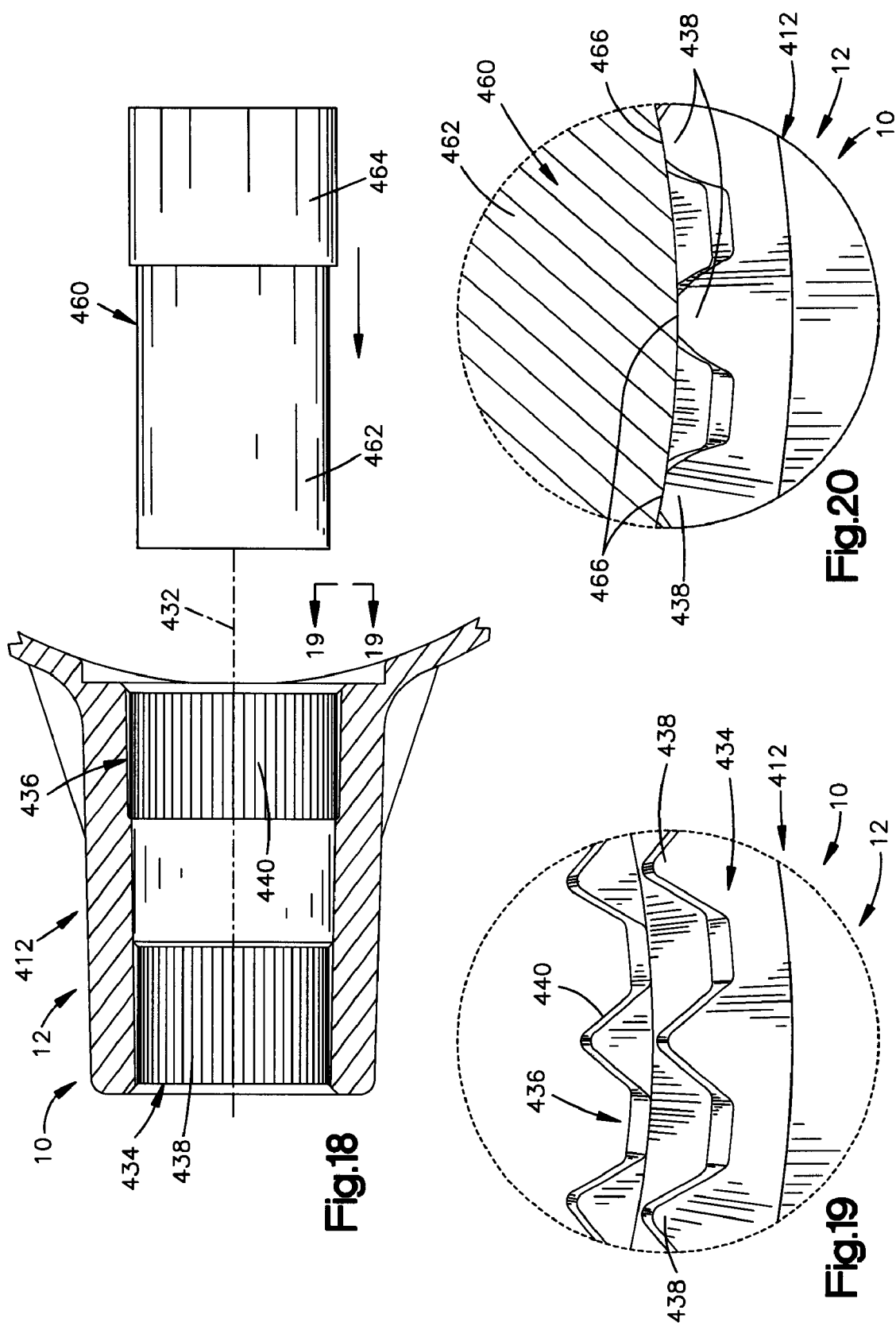

CLUTCH/BRAKE ASSEMBLY FOR VEHICLE

This application claims the benefit of provisional application No. 60/213,513 filed Jun. 22, 2000.

BACKGROUND OF THE INVENTION

The present invention relates to a power transmission assembly for a vehicle. The power transmission assembly includes a clutch/brake assembly that is operative to provide steering action to driven wheels of a vehicle, such as a lawn or garden tractor. The power transmission assembly also includes a housing having cast and coined bearing supports.

BRIEF DESCRIPTION OF THE DRAWINGS

Further features of the present invention will become apparent to those skilled in the art to which the present invention relates from reading the following specification with reference to the accompanying drawings, in which:

FIG. 3A is a view of a brake bracket that forms part of the clutch-brake actuator mechanism;

FIG. 7 is a view showing the clutch/brake assembly in a condition in which the clutch-brake actuator mechanism is retarding rotational movement of one side of the clutch/brake assembly to slow one of the two drive wheels of the vehicle;

FIG. 8 is an enlarged view of a portion of FIG. 7;

FIG. 15 is a plan view of a cast housing part that forms part of the vehicle transmission of FIG. 1;

FIG. 16 is an enlarged sectional view taken along line 16—16 of FIG. 15;

FIG. 18 is an enlarged sectional view taken along line 18—18 of FIG. 15;

FIG. 19 is a view taken along line 19—19 of FIG. 18, showing the part is an as cast condition; and FIG. 20 is a view taken along line 19—19 of FIG. 19, showing the part is a condition after coining.

DESCRIPTION OF EMBODIMENTS OF THE INVENTION

The present invention relates to a power transmission assembly for a vehicle. The power transmission assembly includes a clutch/brake assembly that is operative to provide steering action to driven wheels of a vehicle, such as a lawn or garden tractor. The power transmission assembly also includes a housing having cast and coined bearing supports.

Figure 1:
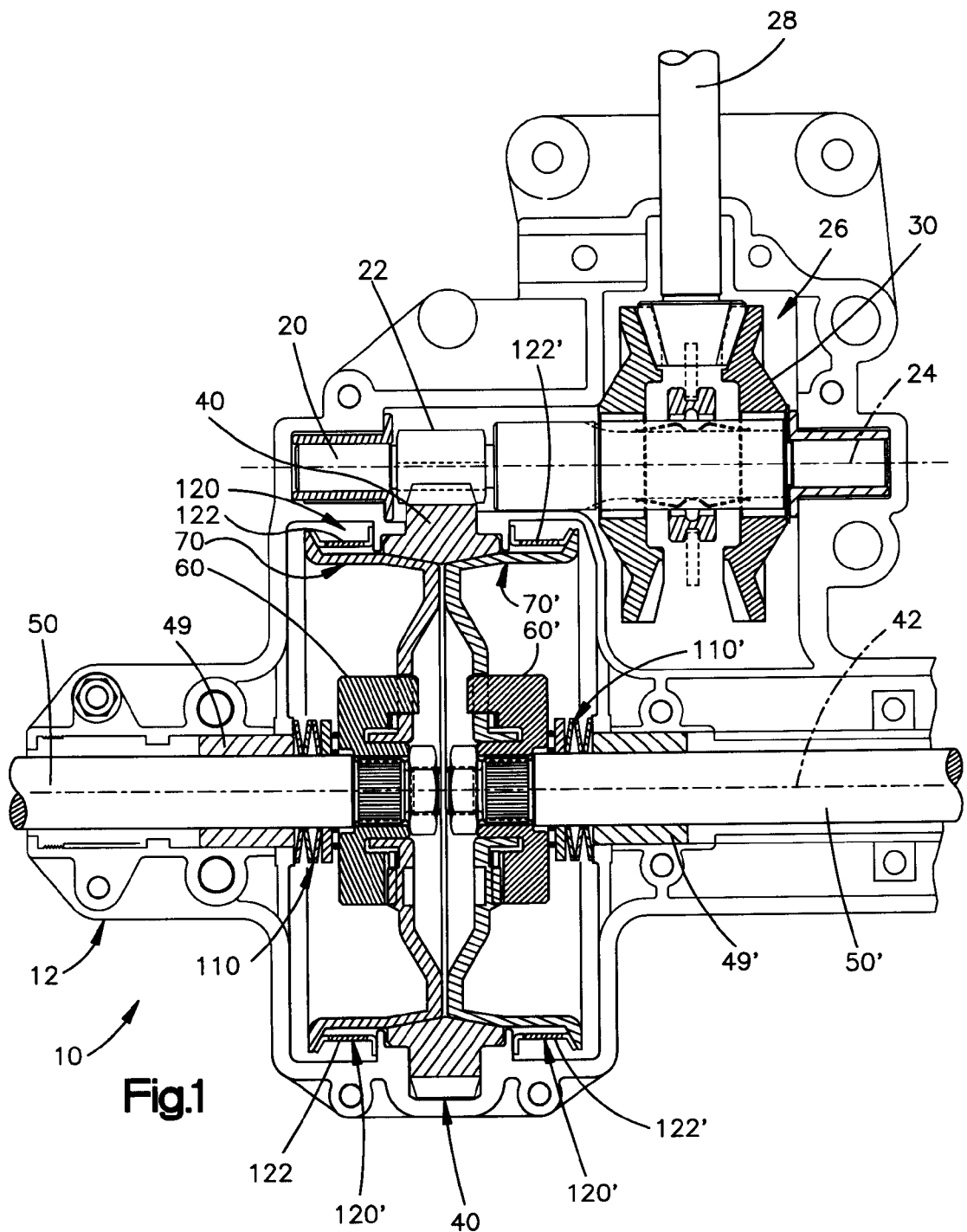
FIG. 1 is a sectional view of a portion of a vehicle transmission including a clutch-brake-assembly in accordance with a first embodiment of the invention, the clutch-brake assembly being shown in a forward drive condition.

As representative of the present invention, FIG. 1 illustrates a clutch/brake assembly 10 of a vehicle 11. The clutch/brake assembly includes a housing 12. The housing 12 is cast as two mating pieces, preferably from aluminum, and only one of which is shown.

The housing 12 supports a pinion shaft 20. The pinion shaft 20 supports a pinion 22. The pinion 22 has external gear teeth and is driven for rotation about a pinion shaft axis 24.

The pinion 22 is rotatable in opposite directions about the axis 24. A directional control transmission assembly 26 controls the direction and speed of rotation of the pinion 22. The directional control transmission assembly 26 receives power from the vehicle engine (not shown). The power is transmitted from the engine through an input shaft 28 and bevel gears 30 to the pinion shaft 24. The pinion 22 thus transmits the motive force or driving force from the vehicle engine to the clutch/brake assembly 10 of the present invention.

A ring gear 40 is supported in the housing for rotation about a first axis 42. In the illustrated embodiment, the ring gear 40 is formed as one piece. The ring gear 40 is externally toothed on its outer periphery. The ring gear 40 is in meshing engagement with the external gear teeth on the pinion 22.

The ring gear 40 has a left drum engagement surface 44. The left drum engagement surface 44 has a smooth, frusto-conical configuration. The left drum engagement surface 44 extends at a relatively small angle to the first axis 42. In the illustrated embodiment, the left drum engagement surface 44 lies at an angle of about ten degrees to the first axis 42.

The ring gear 40 has a right drum engagement surface 46. The right drum engagement surface 46 is a mirror image of the left drum engagement surface 44. The left and right drum engagement surfaces 44 and 46 are located on opposite sides of an axial centerline 48 of the assembly 10.

A set of bearings 49 in the housing support a left axle 50 for rotation relative to the housing 12 about the first axis 42. An inner end portion 52 of the left axle 50 is externally splined. A nut 54 is threaded on the inner end portion 52 of the left axle 50. An outer end portion (not shown) of the left axle 50 is connected for rotation with the left ground wheel (drive wheel) of the vehicle.

The clutch/assembly 10 includes a right axle 50', which is a mirror image of the left axle 50. Parts of the right axle 50' are indicated with the same reference numerals as give to the corresponding parts of the left axle 50, but with a prime suffix (')added.

The clutch/brake assembly 10 includes a left axle hub 60. A radially central portion 62 of the left axle hub 60 is internally splined and is fitted on the splined inner end portion 52 of the left axle 50. The left hub 60 is, thereby, secured for rotation with the left axle 50.

An annular radially outer portion 64 of the left hub 60 is disposed radially outward of the central portion 62. The left hub includes three keys 66 formed on the outer portion 64 of the hub 60. The keys 66 are generally trapezoidal in configuration and project axially inward from the left axle hub 60, in a direction toward the axial centerline 48 of the assembly 10. The keys 66 are disposed in an equally spaced array about the first axis 42.

The left hub 60 includes three sets or pairs of cam ramps 68. The cam ramps 68 project axially inward from the left axle hub 60, at a location radially inward of the keys 66. Each set of cam ramps 68 includes two cam ramps spaced apart circumferentially about the first axis 42. Each one of the keys 66 is located circumferentially between two adjacent pairs of cam ramps 68.

The clutch/brake assembly 10 includes a right axle hub 60', which is a mirror image of the left axle hub 60. Parts of the right axle hub 60' are indicated with the same reference numerals as given to the corresponding parts of the left axle hub 60, but with a prime suffix (') added.

The clutch/brake assembly 10 includes left and right clutch/brake drums 70 and 70'. The drums 70 and 70' are mirror images of each other, and so only the left drum 70 is described in detail herein.

The left drum 70 is formed as one piece and has an annular, drum-like configuration. The left drum 70 has a radially extending end wall 72 with a hub portion 74 defining a circular central opening 76 in the end wall. The central portion 62 of the left axle hub 60 extends through the opening 76 in the hub portion 74 of the end wall 72 of the left drum 70. The left drum 70 is thus supported on the left axle hub 60 for rotation either with, or relative to, the left axle hub. The left drum 70 is also axially movable, by a small amount, on and relative to the left axle hub 60, as described below.

The end wall 72 of the left drum 70 also includes three windows, or openings 78, through the end wall. Each one of the windows 78 has an arcuate, trapezoidal configuration. Each one of the windows 78 receives one of the three keys 66 on the left axle hub 60. The circumferential extent of each window 78 is greater than the circumferential extent of the associated key 66. Thus, the keys 66 are movable circumferentially in the windows 78, providing a limited amount of relative rotation between the left axle hub 60 and the left drum 70 before engaging to stop such motion.

The end wall 72 of the left drum 70 includes three cam fingers 80. The cam fingers 80 are radially extending projections in the end wall 72 of the drum 70, which project axially outward from the end wall. The three cam fingers 80 on the left drum 70 are spaced apart equally about the first axis 46. Each cam finger 80 on the drum end wall 72 is located circumferentially between the two cam ramps 68 of a particular pair of cam ramps on the left axle hub 60. Each cam finger 80 is engageable with one or the other or the two cam ramps 68 upon a predetermined amount of relative rotation between the left drum 70 and the left hub 80.

An annular side wall 90 of the left drum 70 extends axially from the radially outer periphery of the end wall 72. The side wall 90 extends in a direction axially outward, that is, away from the axial center centerline 48 of the assembly 10 (in a direction to the left as viewed in FIG. 2).

A first portion 92 of the side wall 90 has a frustoconical configuration. An outer surface 94 of the first side wall portion 92 forms a ring gear engagement surface of the left drum 70. The ring gear engagement surface 94 extends at a relatively small angle to the first axis 42. Specifically, the ring gear engagement surface 94 lies at the same angle to the first axis 42 as does the left drum engagement surface 44 of the ring gear 40. The ring gear engagement surface 94 of the left drum 70 is selectively engageable, as described below, with the left drum engagement surface 44 of the ring gear 40.

A second portion 96 of the side wall 90 of the left drum 70 extends axially outward from the ring gear engagement surface 94, in a direction parallel to the first axis 42. The second portion 96 has a cylindrical outer surface 98 centered on the axis 42. The outer surface 98 forms an annular brake surface 100 of the left drum 70.

A third portion 100 of the side wall 90 of the left drum 70 extends axially and radially outward from the second portion 96. The third portion 100 has a frustoconical outer surface 102 centered on the axis 42. The outer surface 102 forms an annular clutch surface of the left drum 70. The clutch surface 70 is disposed adjacent to and merges with the brake surface 70.

A light wave washer 106 between the left drum 70 and the left hub 60 urges the left drum axially inward, into engagement with the ring gear 40. In the illustrated embodiment, the left clutch/brake drum 70 is a separate piece from the left axle hub 60. It should be understood that the left clutch/brake drum 70 could be formed as one piece with the left axle hub 60.

The clutch/brake assembly 10 includes a right clutch/brake drum 70', which is a mirror image of the left clutch/brake drum. Parts of the right clutch/brake drum 70' are indicated with the same reference numerals as given to the corresponding parts of the left clutch/brake drum 70, but with a prime suffix (') added.

The assembly 10 includes a left spring assembly 110, which in the illustrated embodiment is three stacked spring washers (Belleville washers). The left spring assembly 110 is located between and acts between the housing 12 and a thrust washer 112. A thrust bearing 114 is located between the thrust washer 112 and the hub 60. Because the left hub 60 is fixed for movement with the left axle 50, the left spring:assembly 110 biases the left hub axially inward, toward the axial centerline 48 of the assembly 10.

The clutch/brake assembly 10 includes a right spring assembly 110', which is a mirror image of the left spring assembly 110. Parts of the right spring assembly 110' are indicated with the same reference numerals as given to the corresponding parts of the left spring assembly 110, but with a prime suffix (') added.

Figures 5, 6:
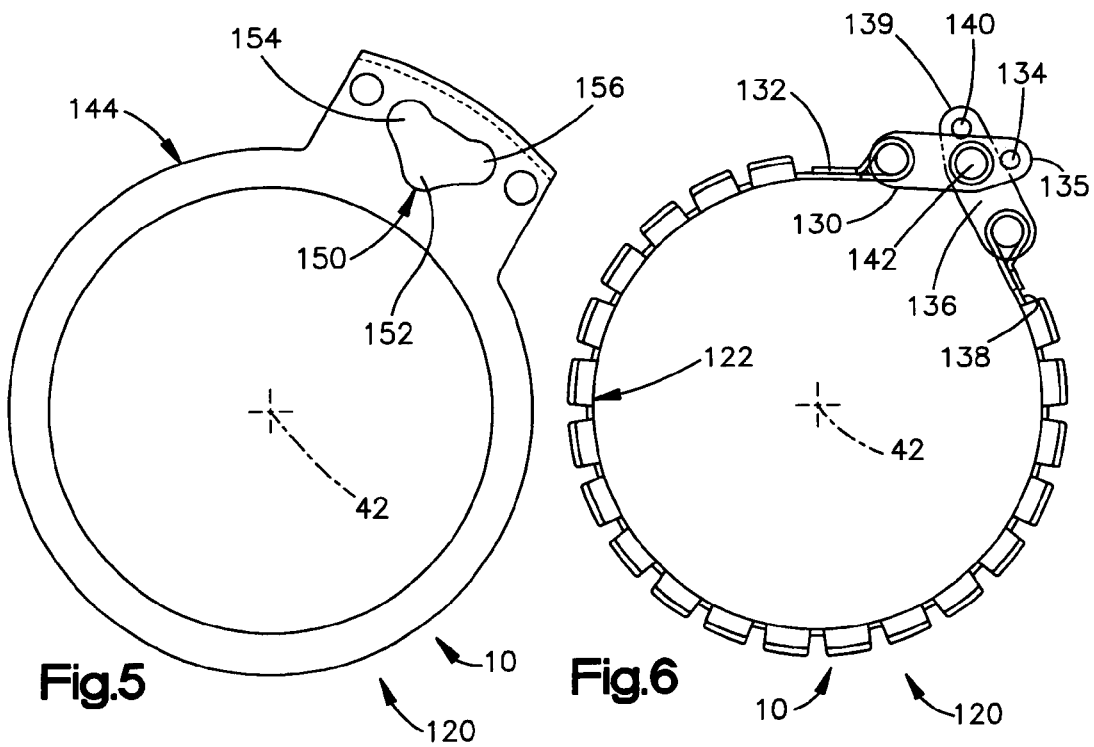
FIG. 5 is a view of a band support member that is part of the band mechanism of FIG. 4.
FIG. 6 is a view of a band that is part of the band mechanism of FIG. 4.

The clutch/brake assembly 10 includes a left clutch/brake band assembly 120. The band assembly 120 includes an arcuate clutch/brake band 122. The band 122 has a flattened, generally U-shaped cross-sectional configuration, as best seen in FIG. 6, including axially inner and outer legs 124 and 126 on opposite sides of a cylindrical central portion 128.

The inner leg 124 extends radially outward from and perpendicular to the central portion 128. The outer leg 126 extends radially outward from the central portion 128 also, but at an angle axially outward also. Therefore, the outer leg 126 of the band 122 has a frustoconical configuration.

Figure 4:
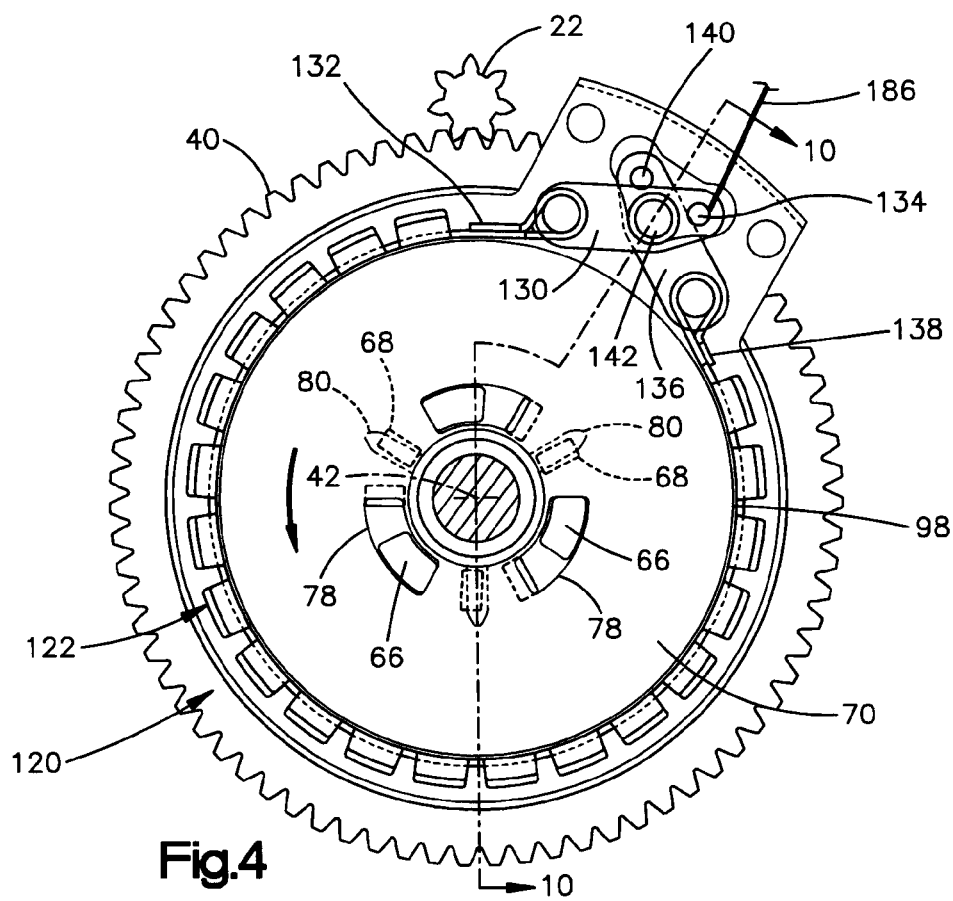
FIG. 4 is a view of a band mechanism that is part of the clutch-brake actuator mechanism, shown in the forward drive condition.

The band assembly 120 also includes a first link 130 (FIG. 4). The first link 130 is connected with a first end portion 132 of the band 122. The first link 130 has an opening 134 at its outer end.

The band assembly 120 also includes a second link 136. The second link 136 is connected with a second end portion 138 of the band 122. The second link has an opening 140, at its outer end. Intermediate portions of the links 130 and 136 are joined by a rivet 141 with a roller 142, so that the links are pivotally movable relative to each other.

The band assembly 120 also includes a band support member 144. The band support member 144 is preferably formed as one piece and is fixed in position on the housing 12. The band support member 144 supports the band 122 on the housing 12, at a position encircling the left drum 70. (The band support member 144 is shown in greater detail in FIG. 5. The band support member 144 has a ring portion 146 that is used only in the embodiment of FIG. 12.)

The band support member 144 has a V-shaped cam opening 150. The V-shaped cam opening 150 includes a central portion 152 and inner and outer legs 154 and 156, which extend upward and outward from the central portion 152. The roller 142 of the band assembly 120 is received in and extends through the cam opening 150 in the band support member 144. The band 122 is radially contractible and expansible relative to the drum 70, as described below. The roller 142 is movable in the cam opening 150 between a plurality of positions, as described below, to control the tightness of the band 122 on the drum 70.

When the band 122 is in position about the drum 70, the central portion 128 of the band is radially outward of the braking surface 98 of the drum. The outer leg 126 of the band 122 is disposed radially outward of the clutch surface 102 of the drum 70. The inner leg 124 of the band 122 is in sliding engagement with a radially extending, fixed wall portion 158 of the housing 12.

The clutch/brake assembly 10 includes a right clutch/brake band assembly 120', which is a mirror image of the left clutch/brake band assembly 120. Parts of the right clutch/brake band assembly 120' are indicated with the same reference numerals as given to the corresponding parts of the left clutch/brake band assembly 120, but with a prime suffix (') added.

The clutch/brake assembly 10 includes a mechanism 160 for controlling the diameter of the bands 122 and 122' and, thereby, the engagement of the bands on the drums 70 and 70'. The mechanism 160 includes a two-piece bracket assembly, including a brake bracket 162 and a steering bracket 164.

Figure 3:
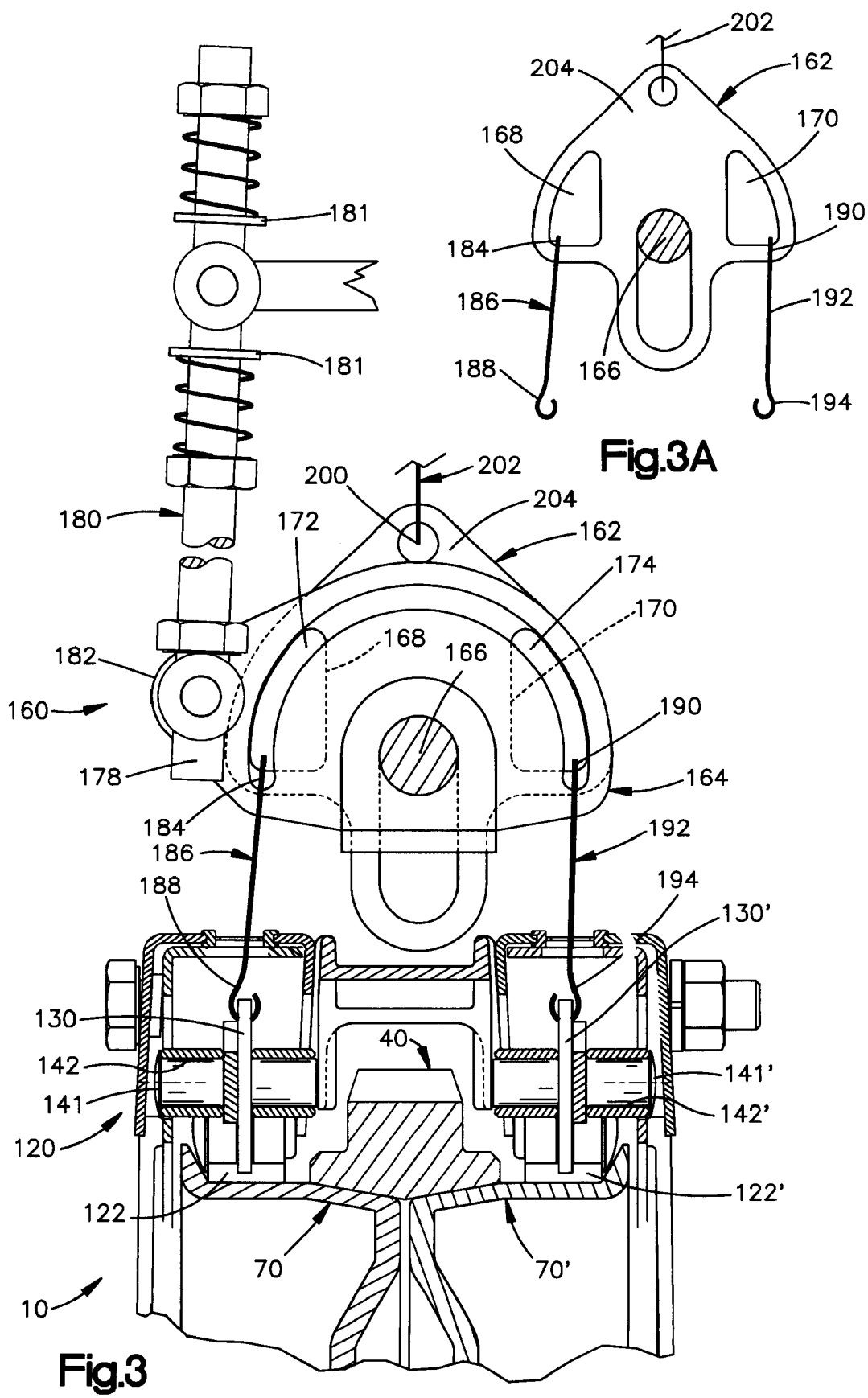
FIG. 3 is a further enlarged view of a portion of the clutch-brake assembly including a clutch-brake actuator mechanism therefor, shown in a neutral condition.

The brake bracket 162 is supported for sliding movement on a fixed pin 166. The brake bracket 162 is slidable along the pin 166, toward and away from the left and right brake bands 122 and 122'—that is, in upward and downward directions as viewed in FIG. 3. The brake bracket 162 has two openings 168 and 170 on opposite sides.

The steering bracket 164 is supported on the brake bracket 162 for sliding movement with the brake bracket relative to the pin 166. The steering bracket 164 is also pivotal on the pin 166. The steering bracket 164 has a left guide slot 172. The left guide slot 172 has an arcuate configuration centered on the pivot pin 166 when the steering bracket 164 is in the position shown in FIG. 3.

The steering bracket 164 also has a right guide slot 174. The right guide slot 174 is a mirror image of the left guide slot 172. The right guide slot 174 has an arcuate configuration centered on the pivot pin 166 when the steering bracket 164 is in the position shown in FIG. 3.

One end portion 178 of a steering rod 180 of the vehicle 11 is pivotally connected with an extension portion 182 of the steering bracket 164. The opposite end portion (not shown) of the steering rod 180 is connected with the manually movable steering control of the vehicle 11. Movement of the steering control in opposite directions causes the steering rod 180 to relative to the pivot pin 166 (up and down as viewed in FIG. 3). Such movement of the steering rod 180 causes pivotal movement of the steering bracket 164 about the pivot pin 166.

One end portion 184 of a left band actuator rod indicated schematically at 186 is received in the left guide slot 172 of the steering bracket 164. The end portion 184 also extends into the left opening 168 in the brake bracket 162. The opposite end portion 188 of the left band actuator rod 186 is connected with the end portion 184 of the first link 130 of the left band assembly 122.

One end portion 190 of a right band actuator rod indicated schematically at 192 is received in the right guide slot 174 of the steering bracket 162. The end portion 190 also extends into the right opening 170 in the brake bracket 164. The opposite end portion 194 of the right band actuator rod 192 is connected with the end portion 190 of the first link 130' of the right band assembly 122'.

One end portion 200 of a brake rod shown schematically at 202 is connected with a central portion 204 of the brake bracket 164. The opposite end portion (not shown) of the brake rod 202 is connected with the manually movable brake control (such as a brake pedal) of the vehicle 11. Movement of the brake control acts through the brake rod 202 to cause sliding movement of the brake bracket 164 along the pivot pin 166.

Operation

The following discussion refers to the left drum 70 and its associated parts. Operation of the right drum 70' and its associated parts is similar and so will not be described herein.

Figure 2:
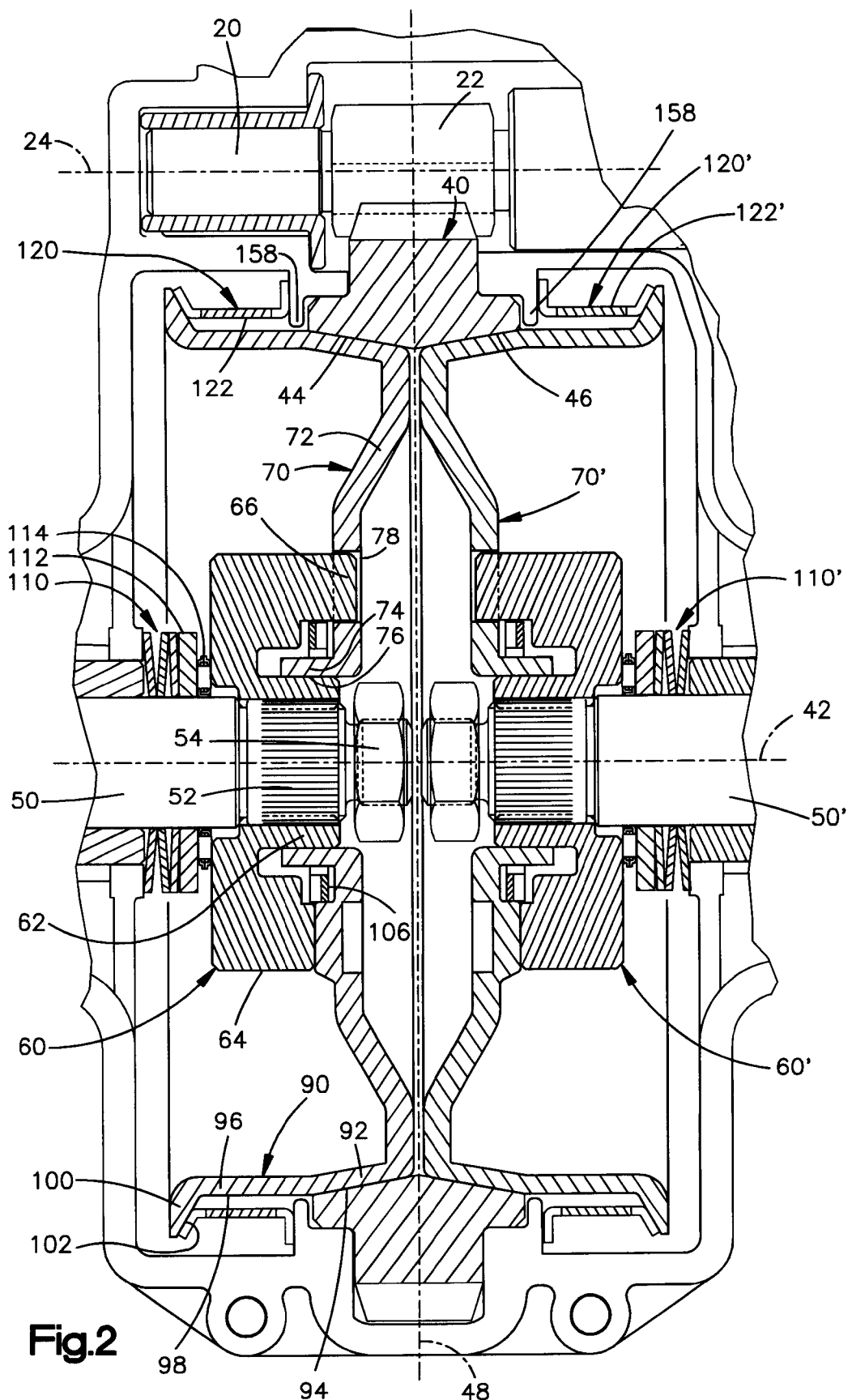
FIG. 2 is an enlarged view of a portion of the clutch-brake assembly of FIG. 1.

When the vehicle is started from a neutral condition, the parts of the assembly 10 are in the condition shown in FIG. 2. The wave washer 106 between the left drum 70 and the left hub 60 urges the left drum axially inward, into engagement with the ring gear 40. This engagement is very light, however, and is subject to slippage.

When the vehicle engine is running and one of the forward drive gears of the vehicle is engaged, the pinion 22 rotates with drive force from the engine. The rotation of the pinion 22 is transmitted to the ring gear 40, and the ring gear rotates about the first axis 24. Driving force from the pinion 22 is transmitted through the ring gear 40 into the left drum 70. The left drum 70 begins to rotate about the first axis 42.

The rotation of the left drum 42 occurs relative to the left hub 60. This relative rotation continues until the surfaces defining the edges of the windows 78 in the drum 70 engage the keys 66 on the hub 60. The rotational force of the drum 70 is, thereafter, transmitted to the hub 60, causing the hub to rotate about the first axis 42. The rotation of the hub 60 is transmitted through the splined connection 52, 62 to the left axle 50. The left axle 50 rotates about the first axis 42, and the left wheel turns, driving the vehicle forward along the ground surface.

While the left drum 70 is thus turning relative to the left hub 60 upon startup, and before the movement of the keys 66 in the windows 78 stops, one of the two cam ramps 68 in each pair of cam ramps 68 on the hub 60, engages one of the associated cam fingers 80 on the left drum 70. The engagement of the cam ramp 68 with the cam finger 80 does not directly cause the hub 60 to rotate. Rather, the engagement of the drive wheel on the ground surface, with the weight of the vehicle, resists rotation of the drive wheel and, thereby, resists rotation of the left hub 60 when it is thus engaged by the cam ramps 68 on the left drum 70. The resistance to rotation of the left hub 60 causes the cam finger 80 on the left drum 70 to ride up along the cam ramp 68 on the hub 60. The left drum 70 and the hub 60 are forced to separate axially by a small amount. Specifically, the left drum 70 is forced axially inward, into tighter engagement with the ring gear 40. This increases the amount of driving force transmitted through the ring gear 40 into the left drum 70. Thus, the clutch/brake assembly 10 has a self-energizing effect upon startup, overcoming the initial slip-fit engagement of the left drum 70 with the ring gear 40.

At the same time as the left drum 70 is being urged axially inward, the hub 60 is forced axially outward, against the bias of (and compressing) the left spring assembly 110. The compression distance of the left spring assembly 110 enables the necessary relative axial movement of the hub 60 and the left drum 70 to accommodate the engagement of the cam fingers 80 on the left drum with the cam ramps 68 on the hub.

Steering Changes

When the vehicle is moving forward without steering more than a small amount, the parts of the band assemblies 120 and 120' are positioned as shown in FIGS. 1 and 2.

If the operator steers left by a small amount, initial slack in the steering assembly means that this steering movement is not transmitted into the steering rod 180. If, however, the operator steers left by more than a small amount, one of two stops 181 (FIG. 3) on the steering rod 180 is engaged and the steering rod 180 moves upward as viewed in FIG. 3. The steering rod movement is transmitted through the steering bracket 164 into the left band actuator rod 186. The rod 186 pulls upward on the link 130 on the end 132 of the band 120. The force on the band end 132 causes the roller 142 to move up the cam opening 150 in the band support member 144. This movement tightens the left band 122 around the left drum 70, causing the band to move radially inward on the drum.

As the left band 122 moves radially inward (FIG. 2), the inner leg 124 of the band slides along the ridge 158 on the housing. The outer leg 126 of the left band 122 engages the frustoconical clutch surface 102 on the left drum 70 and pushes the drum axially outward, against the bias of the left wave washer 106 and the left spring assembly 110. The axial outward movement of the left drum 70 starts to disengage the drum from the ring gear 40, decreasing the driving force transmitted to the drum and the drive wheel. With enough band movement in this direction, the driving force is completely removed and the left drive wheel is therefore in neutral. This helps to steer the vehicle to the left, since the right wheel is still being fully driven. In addition, the engagement of the left band 122 with the left drum 70 effects a small amount of braking force.

Figure 9:
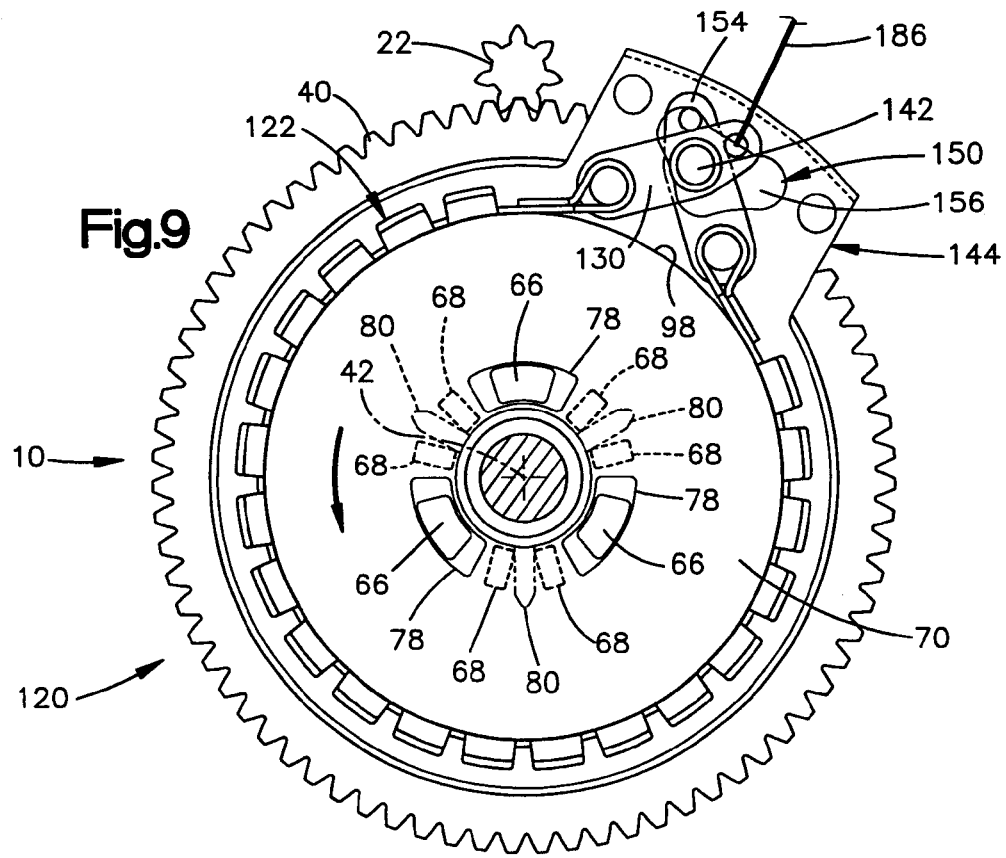
FIG. 9 is a view similar to FIG. 4 showing the band mechanism in a declutching condition.
Figure 10:
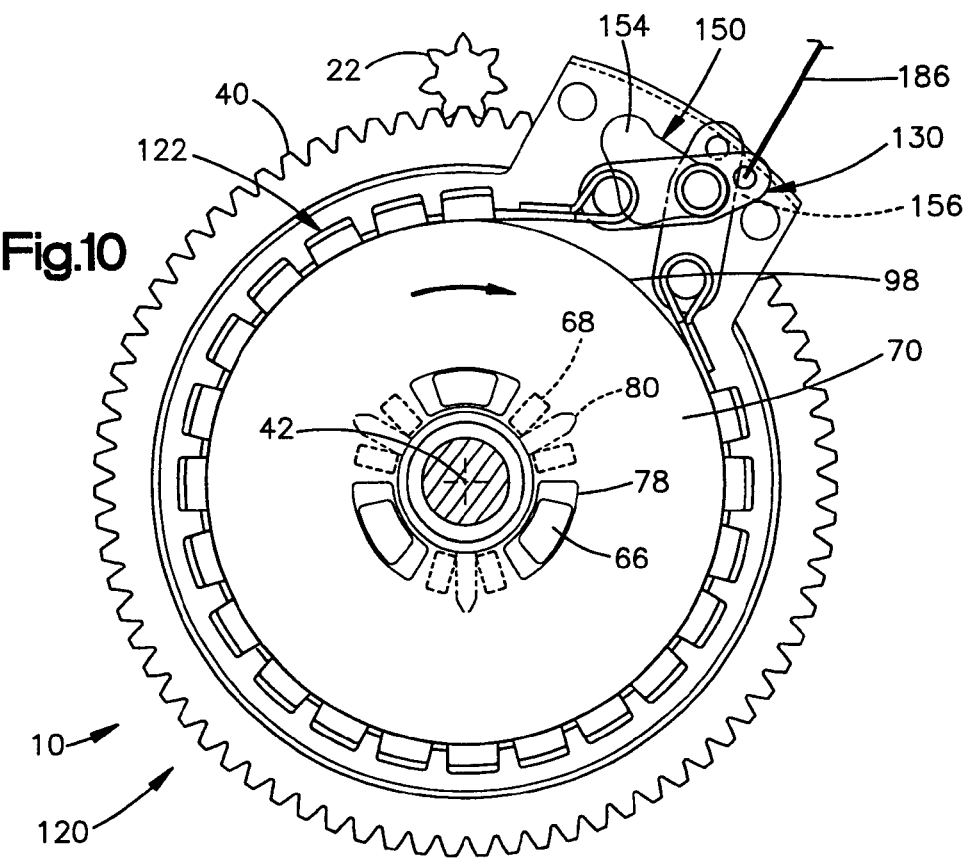
FIG. 10 is a view similar to FIG. 9 showing the band mechanism in a reverse drive and braking condition.

If the left band 122 is tightened radially inward even more, the central portion 128 of the band engages the braking surface 98 on the left drum 70. The left band 122 starts to clamp radially inward onto the left drum 70. The force of the rotating drum 70 is transmitted into the band 122, causing the band to rotate a small amount about the band support 144 until the roller 142 moves further on one of the legs 154 or 156 of the cam opening 150, as seen in FIGS. 9 and 10. At that point, the band 122 can no longer rotate, and the engagement of the band with the braking surface 98 on the drum 70 stops the rotation of the drum. This acts to stop the hub 60 and the axle from rotating. This helps even more to steer the vehicle to the left, since the right wheel is being fully driven.

The brake bracket 162 allows the clutch/brake assembly 10 to serve as a parking brake for the vehicle. Specifically, if the vehicle brake control is moved, tensile force on the brake rod 200 causes the brake bracket 162 to be moved upward (as viewed in FIGS. 9 and 10) relative to the pin 166. The brake bracket 162 pulls on both the left and right band actuator rods 186 and 193. Both the left and right bands 122 and 122' are contracted, on the left and right drums 70 and 70', respectively. Both drums 70 and 70' are braked, and as a result, both the left and right drive wheels are braked. This brake and parking brake thus has no differential action on the wheels, but instead brakes both wheels with direct two-wheel braking.

Second Embodiment

Figure 11:
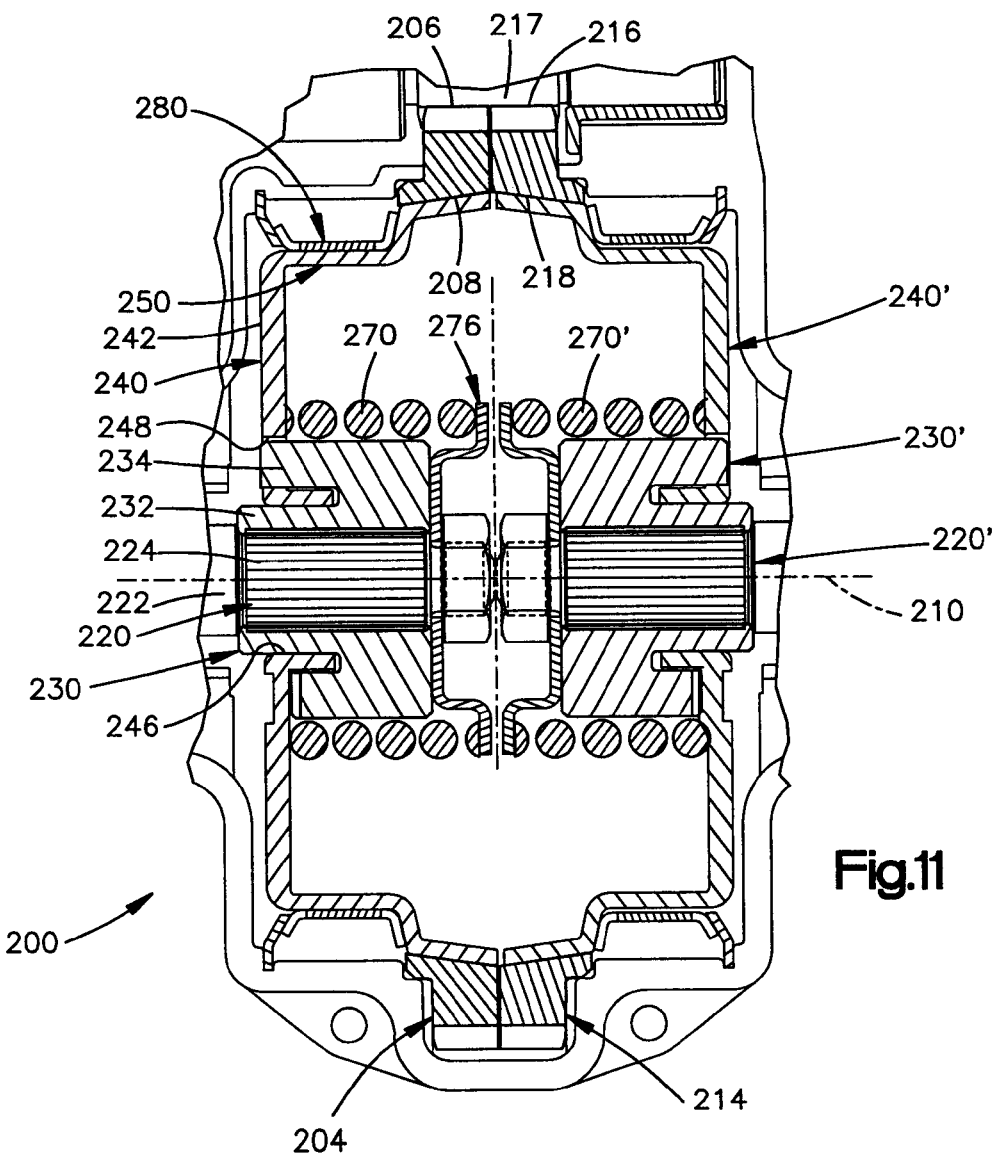
FIG. 11 is a view similar to FIG. 2 of a portion of a clutch-brake assembly constructed in accordance with a second embodiment of the invention.
Figure 12:
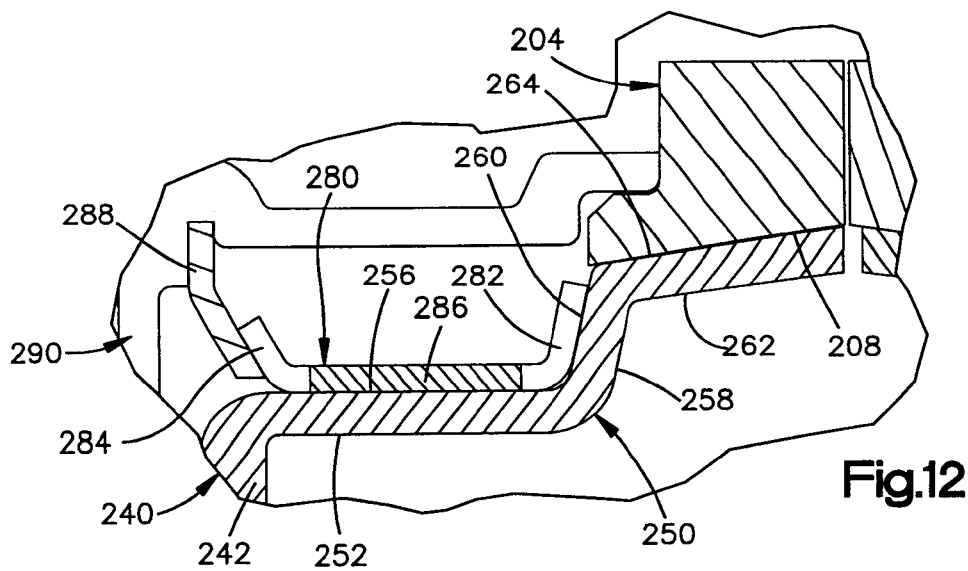
FIG. 12 is an enlarged view of a portion of FIG. 11.

FIGS. 11 and 12 illustrate a portion of a clutch/brake assembly 200 in accordance with a second embodiment of the invention. In the clutch/brake assembly 200, the ring gear is formed as two pieces including an annular left ring gear 204 and an annular right ring gear 214.

The left ring gear 204 is externally toothed on its outer periphery 206 and has a smooth, frustoconical, radially inner surface 208. The inner surface 208 forms a drum engagement surface of the left ring gear 204. The drum engagement surface 208 extends at a relatively small angle to a first axis 210. In the illustrated embodiment, the drum engagement surface 208 lies at an angle of about ten degrees to the first axis 210.

The right ring gear 214 is a mirror image of the left ring gear 204. The right ring gear 214 is externally toothed on its outer periphery 216 and has a smooth, frustoconical, radially inner surface 218. The gear teeth on the outer peripheries 206 and 216 of the left and right ring gears 204 and 214, respectively, are in meshing engagement with the external gear teeth on the pinion 217.

The inner surface 218 of the right ring gear 214 forms a drum engagement surface of the right ring gear. The drum engagement surface 218 extends at a relatively small angle to the first axis 210. In the illustrated embodiment, the drum engagement surface 218 lies at an angle of about ten degrees to the first axis 210.

The housing 12 supports a left axle assembly 220 for rotation relative to the housing about the first axis 210. The left axle assembly 220 includes a left axle 222. An inner end portion 224 of the left axle 220 is externally splined. A left spring retainer 226 is secured on the inner end portion 224 of the left axle 222 by a bolt 228. An outer end portion (not shown) of the left axle 222 is connected with the left ground wheel (drive wheel) of the vehicle. The clutch/brake assembly 200 also includes a right axle assembly 220', which is a mirror image of the left axle assembly 220.

The clutch/brake assembly 200 includes an internally splined left axle hub 230 secured for rotation with the splined inner end portion 224 of the left axle 222. A radially central portion 232 of the left axle hub 230 has a cylindrical configuration extending around the left axle 222.

The left axle hub 230 also includes three keys 234 that project axially outward from the left axle hub. The keys 234 are spaced apart equally, circumferentially, about the first axis 210. The left axle hub 230 also may include features for providing a self-energizing effect upon startup, as described above with reference to the first embodiment of the invention. The clutch/brake assembly 200 includes a right axle hub 230', which is a mirror image of the left axle hub 230.

The clutch/brake assembly 200 includes left and right clutch/brake drums 240 and 240'. The left drum 240 is formed as one piece and has an annular, drum-like configuration. The left drum 240 has a radially extending end wall 242 defining a circular central opening 246 in the wall 242. The central portion 232 of the left axle hub 230 extends through the opening 246 in the end wall 242 of the left drum 240. The left drum 240 is thus supported on the left axle hub 230 for rotation with, or relative to, the left axle hub 230. The left drum 240 is also axially movable, by a small amount, on and relative to the left axle hub 230.

The end wall 242 of the left drum 240 includes three windows, or openings 248 through the end wall. Each one of the windows 248 has an arcuate, trapezoidal configuration. Each one of the windows 248 receives one of the three keys 234 on the left axle hub 230. The circumferential extent of each window 248 is greater than the circumferential extent of the associated key 234. Thus, the keys 234 are movable circumferentially in the windows 248, during a limited amount of relative rotation between the axle hub 230 and the drum 240.

The left drum 240 has an annular side wall 250 (FIGS. 11 and 12) extending from the radially outer periphery of the end wall 242. A first portion 252 (FIG. 11) of the side wall 250 extends axially inward from the end wall 242, in a direction parallel to the first axis 210 and toward the axial centerline 254 of the clutch/brake assembly 200. The first portion 252 has a cylindrical outer surface 256 centered on the axis 210. The outer surface 256 forms an annular braking surface of the left drum 240.

A frustoconical second portion 258 of the side wall 250 extends axially inward and radially outward from the first portion 252, forming a clutch surface 260 of the drum 240. A frustoconical third portion 262 of the side wall 250 extends axially inward and radially outward from the second portion 262. An outer peripheral surface 264 of the third side wall portion 262 forms an annular ring gear engagement surface of the left drum 240. The ring gear engagement surface 264 lies at the same angle to the first axis 210 as does the inner drum engagement surface 208 of the left ring gear 204. The ring gear engagement surface 264 of the left drum 240 is selectively engageable, as described below, with the drum engagement surface 208 of the left ring gear 204.

In the illustrated embodiment, the left clutch/brake drum 240 is a separate piece from the left axle hub 230. It should be understood that the left clutch/brake drum 240 could be formed as one piece with the left axle hub 230. The clutch/brake assembly 200 also includes a right clutch/brake drum 240', which is a mirror image of the left clutch/brake drum 240.

As noted above, the left drum 240 is axially movable, by a small amount, on and relative to the left hub 230. The clutch/brake assembly 200 includes a left compression spring 270 (FIG. 11), which is located between and acts between the left spring retainer 276 and the left drum 240. Because the left spring retainer 276 is fixed for movement with the left axle hub 230, the left spring 270 biases the left drum 240 axially outward, away from the left spring retainer 276, relative to the left axle 222.

When the left drum 240 is located fully axially outward relative to the left axle 222, the ring gear engagement surface 264 on the left drum 240 is fully engaged with the drum engagement surface 208 on the left ring gear 204. The left drum 240 is then in full force-transmitting engagement with the left ring gear 204, and rotation of the left ring gear will cause rotation of the left drum. The clutch/brake assembly 200 also includes a right compression spring 270', which is a mirror image of the left spring 270.

The clutch/brake assembly 200 includes a left clutch/brake band 280 (FIGS. 11 and 12). The band assembly 280 in most aspects is similar in construction and operation to the band 122 of the first embodiment of the invention. The configuration and movement of the band 280 are, however, somewhat different.

Specifically, both the inner and outer legs 282 and 284 (FIG. 12) of the band 280 extend at an angle, not perpendicular, to the central portion 286. The outer leg 284 of the band 280 is engageable with a fixed, angled guide member 288 on the housing 290. The guide member 288 is part of the band support member 140 (FIG. 5). The inner leg 282 of the band 280 is engageable with the clutch surface 260 on the frustoconical second portion 258 of the drum 240.

When the band 280 is in position about the drum 240, the central portion 286 of the band is radially outward of the braking surface 256 of the drum 240. The outer leg 284 of the band 280 is disposed radially outward of the guide member 288 of the housing 290. The inner leg 282 of the band 280 is in sliding engagement with the third portion 258 of the side wall 250 of the drum 240. The clutch/brake assembly 200 also includes a right clutch/brake band 280' that is a mirror image of the left clutch/brake band 280.

Operation

This discussion refers to the left drum 240 and its associated parts. Operation of the right drum 240' and its associated parts is similar and so will not be described herein.

When the vehicle is started from a neutral condition, the left compression spring 270 urges the left drum 240 axially outward, into engagement with the left ring gear 204. When the pinion 217 rotates with drive force from the engine, the rotation of the pinion is transmitted to the left ring gear 204. The left ring gear 204 rotates about the first axis 210. Driving force from the pinion 217 is transmitted through the left ring gear 204 into the left drum 240. The left drum 240 begins to rotate about the first axis 210.

The left drum 240 rotates relative to the left axle hub 230 until the surfaces defining the edges of the windows 248 in the drum 240 engage the keys 238 on the hub 230. The rotational force of the drum 240 is, thereafter, transmitted to the hub 230, causing the hub to rotate about the first axis 210. The rotation of the hub 230 is transmitted through the splined connection to the left axle 220. The left axle 220 rotates about the first axis 210, and the left wheel turns, driving the vehicle forward along the ground surface.

Steering Changes

If the vehicle operator steers by more than a small amount, the band 280 is contracted radially inward on the drum 240. As the band 280 moves radially inward, the outer leg 284 of the band slides along the guide member 288. The angled guide member 288 moves the band 280 axially inward, toward the centerline, as the band simultaneously moves radially inward. The inner leg 282 of the band 280 engages the frustoconical clutch surface 260 on the drum 240 and pushes the drum axially inward, against the biasing force of the compression spring 270. The axial inward movement of the drum 240 starts to disengage the drum from the left ring gear 204, decreasing the driving force transmitted to the left drum and the left drive wheel. With enough band movement in this direction, the driving force is completely removed and the left drive wheel is therefore in neutral. This helps to steer the vehicle to the left, since the right wheel is still being fully driven. In addition, the engagement of the band 280 with the drum 240 effects a small amount of braking force.

If the band 280 is tightened radially inward even more, the central portion 286 of the band engages the braking surface 256 on the drum 240 as shown in FIG. 12. The band 280 starts to clamp radially inward onto the drum 240. The engagement of the band 280 with the braking surface 256 on the drum 240 stops the rotation of the drum, in a manner as described above with reference to the first embodiment of the invention. This acts to stop the hub 230 and axle 220 from rotating, and helps even more to steer the vehicle to the left, since the right wheel is being fully driven.

Third Embodiment

Figure 13:
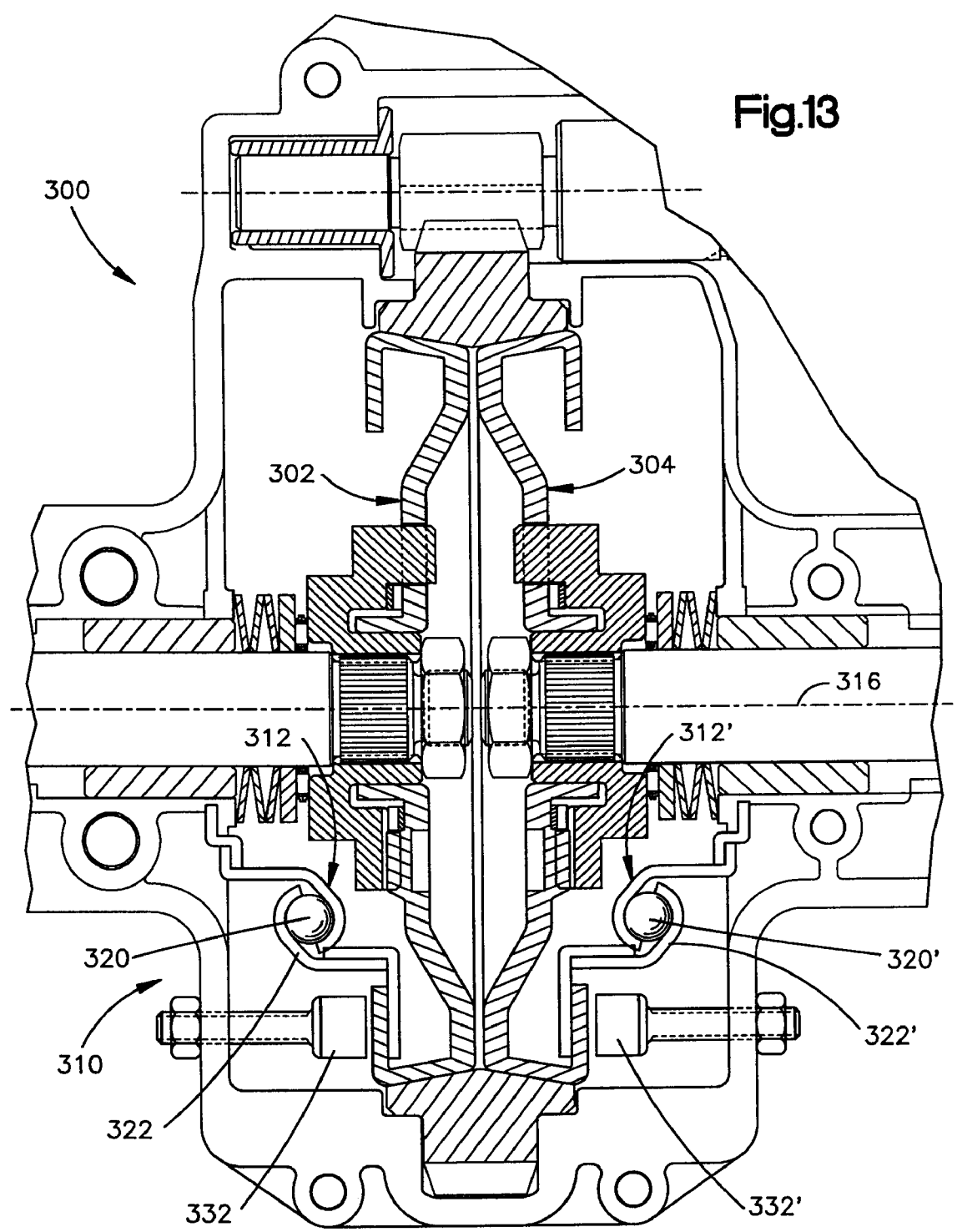
FIG. 13 is a view similar to FIG. 2 of a portion of a clutch-brake assembly constructed in accordance with a third embodiment of the invention.
Figure 14:
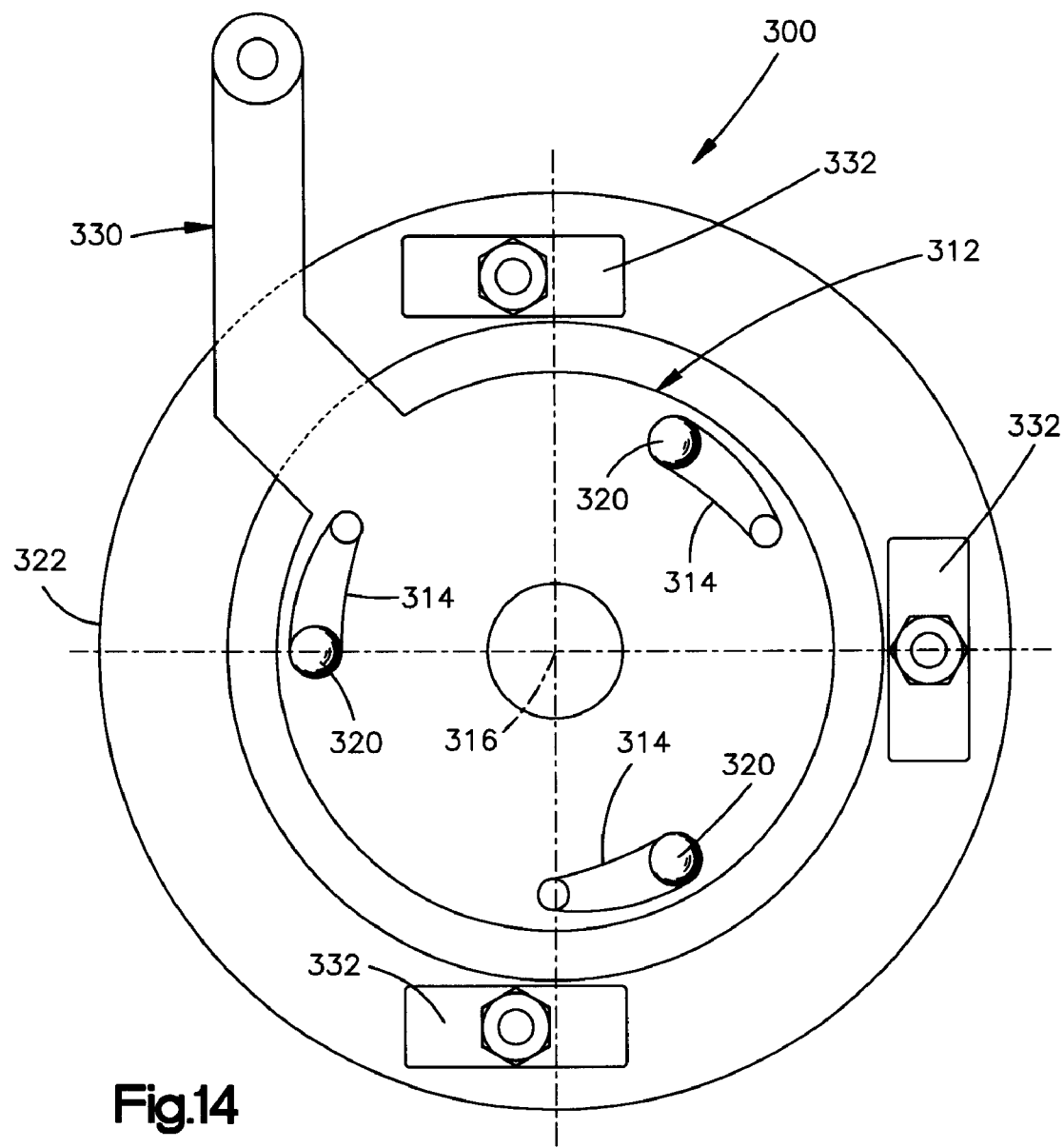
FIG. 14 is an elevational view of the assembly of FIG. 13.

FIGS. 13 and 14 illustrate a clutch/brake assembly 300 in accordance with a third embodiment of the invention. The clutch/brake assembly 300 includes left and right drums 302 and 304 movable into and out of engagement with a ring gear 306. In the assembly 300 of FIGS. 13 and 14, radially contractible bands are not used to move the drums 302 and 304.

Specifically, the assembly includes a ball clutch/brake mechanism 310 for moving the left drum 302 and a similar mechanism 310' for moving the right drum 304. The mechanism includes a cam plate 312. The cam plate 312 has a generally circular configuration when viewed in elevation as in FIG. 14. The cam plate 312 has three arcuate ramps 314 spaced apart equally in a circular array centered on an axis 316. Each ramp 314 has a tapered configuration.

The ball clutch/brake mechanism 310 also includes three balls 320 spaced apart equally in a circular array centered on the axis 316. Each one of the three balls 320 is located in one of the three ramps 314. The ball clutch/brake mechanism 310 also includes three movable members 322. Each one of the balls 320 is captured axially between the cam plate 312 and one of the three movable members 322.

The cam plate 312 has an actuator arm 330. When force is applied to the actuator arm 330, the cam plate 312 pivots about the axis 316. The ramps 314 force the balls 320 to move axially by a small amount, sufficient to move the movable members 322. The movable members 322 pull on the drum 302 (laterally, or axially) to move it out of engagement with the ring gear 306. As a result, the driving engagement between the ring gear 306 and the drum 302 is lessened in magnitude. Thus, if the cam plate actuator arm 330 is moved in the same manner as the steering actuator of the embodiment of FIGS. 1–11 is moved, the clutch/brake assembly 300 of FIGS. 13 and 14 is operable with the same effect as the clutch/brake assembly of FIGS. 1–11.

When the movable members 322 are pulled farther as a result of additional turning of the cam plate 312, the drum 302 is pulled into engagement with a set of brake pads 332. The brake pads 332 slow and eventually stop rotation of the drum 302, in the manner of a disc brake. Thus, the clutch/brake assembly 300 acts as a brake also.

Bearing Supports

The housing of the clutch/brake assembly 10 (FIG. 1) is made from two halves secured together along a common plane to form the housing. Each one of the housing halves is cast as one piece from a material such as aluminum. FIG. 15 illustrates one of the two housing pieces 12, in a view, looking from the common plane (numbered 401 in the drawings). The second pieces (not shown) is a mirror image in relevant aspects.

The housing part 12 shown in FIG. 15 has a plurality of bearing supports. The bearing supports are designed to support non-rotating bearings. The bearings receive shafts rotatable relative to the housing. It is desirable that the shafts be aligned relative to each other within very close tolerances. To accomplish this, it is necessary that the bearing supports of the housing part 12 be both formed and aligned in an accurate and precise manner. The necessary formation and alignment of the bearing supports can not be obtained solely with casting. Thus, the bearing supports are ordinarily machined. Machining, however, is a relatively expensive and difficult process.

In accordance with the present invention, the bearing supports of the housing part 12 are first cast as one piece with the housing and, thereafter, pressed to their final configuration. All the bearing supports are pressed at one time, with tools precisely aligned with each other, to provide accurate formation and alignment of the bearing supports. In addition, at least some of the bearing supports are pressed with a hexagonal (hex) configuration to provide a self-alignment feature for hexagonal, non-rotating bearings.

The plurality of bearing supports of the housing part 12 includes (a) inner and outer bearing supports 400 and 402 for the left axle 50 and (b) inner and outer bearing supports 404 and 406 for the right axle 50'. The plurality of bearing supports also includes (c) first and second bearing supports 408 and 410 for the pinion shaft 20, which supports the pinion 22, and (d) a bearing support 412 for the input shaft.

The inner and outer bearing supports 400 and 402 for the left axle 50 are similar in configuration to each other, the only difference being that the outer bearing support 402 has a portion 403 for receiving a lip seal. The inner and outer bearing supports 404 and 406 for the right axle 50' are similar in configuration to each other, the only difference being that the outer bearing support 406 has a portion 407 for receiving a lip seal.

The inner bearing support 400 for the left axle 50 is identical to the inner bearing support 404 for the right axle 50'. The outer bearing support 402 for the left axle 50 is identical to the outer bearing support 406 for the right axle 50'.

The four bearing supports 400-406 for the axles 50 and 50' are all centered and aligned on the same axis, which is the first axis 42 (FIGS. 1 and 15). These four bearing supports 400–406 are, as cast, not ready to receive bearings, but are finished and sized with a hex configuration, during a subsequent coining step, to accept a hexagonal bearing. The first and second bearing supports 408 and 410 for the pinion shaft 20 are also finished and sized with a hex configuration during the subsequent coining step.

The hex bearing supports 400–410 are all similar in construction and so only the outer bearing support 402 for the left axle 50 is described, as exemplary. The bearing support 402, as cast, has a partially hexagonal cross-sectional configuration. The partially hexagonal cross-sectional configuration includes two full sides 416 and 418 and two opposite half sides 420 and 422. When assembled with the other housing part, it forms a fully hexagonal cross-sectional configuration to receive a hexagonal bearing.

The bearing support 402 includes a plurality of serrations 424 arranged along the one full side 416 of the partially hexagonal configuration. The serrations 424 extend in a direction normal to the first axis 42. The bearing support 402 includes a plurality of serrations 426 arranged along the other full side 418 of the partially hexagonal configuration. The serrations 426 extend in a direction normal to the first axis 42. Short serrations 428 are formed on the two half-sides 420 and 422.

A gap 430 exists between the two full sides 416 and 418. The gap 430 forms one of the V-shaped corners of the hexagonal configuration. The gap 430 is at the bottom of the bearing support 402—that is, farthest from the common plane 401 between the two housing parts.

As cast, the bearing support 412 for the input shaft has a generally cylindrical configuration centered on a second axis 432. The second axis 432 extends transverse to the first axis 24. Specifically, the second axis 432 extends perpendicular to the first axis 24 and to the common plane 401.

A first portion 434 of the cylindrical configuration has a first diameter. A second portion 436 of the cylindrical configuration has a second diameter, greater than the first diameter. The second portion 436 is spaced apart axially from the first portion 434.

The bearing support 412 includes a plurality of axially extending first serrations 438 arranged along the first portion 434 of the cylindrical configuration. A plurality of axially extending second serrations 440 are arranged along the second portion 436 of the cylindrical configuration.

The bearing supports 400–412 are finished (sized) as follows. All the bearing supports 400–412, including the bearing support 412 for the input shaft, are finished (coined) in one operation, by moving a plurality of punches into engagement with the casting 12 in one stroke.

Figure 17:
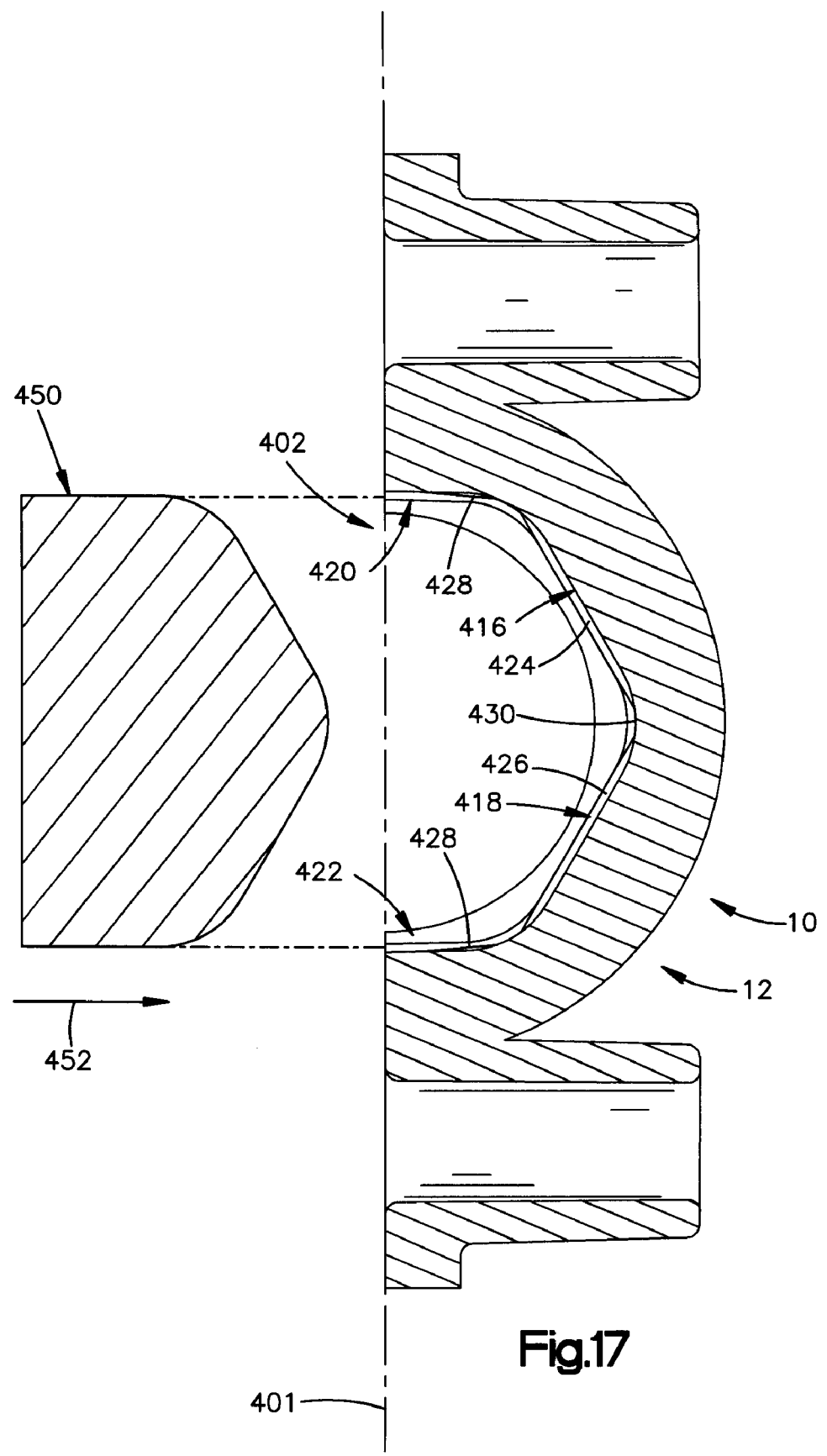
FIG. 17 is an enlarged sectional view taken along line 17—17 of FIG. 15.

To coin each one of the hex bearing supports 400–410, a hexagonal punch 450 (FIG. 17) is moved in the direction indicated by the arrow 452 in FIG. 17. The punch 450 is moved into engagement with the serrations 424 and 426 on the sides 416 and 418, respectively, of the bearing support 402. The punch 450 deforms the serrations 424 and 426 to finish the bearing support 402. This provides a sized bearing support surface with a generally hexagonal configuration. The bearing support surface comprises the tops of the deformed serrations 424, 426 and 428.

All of the hex bearing supports 400–410 are coined simultaneously, using a plurality of punches that are precisely aligned relative to each other, to provide hexagonal bearing support surfaces that are precisely aligned relative to each other. All the finished bearing support surfaces are parallel to the first axis 42. As a result, no machining of the casting 12 is needed.

The cylindrical bearing support 412 for the input shaft is coined to finish it in an operation that is simultaneous with the finishing of the hex bearing supports 400–410. Specifically, there is provided a single punch 460 (FIG. 18) having a generally cylindrical configuration including a first cylindrical finishing portion 462 having a first diameter and including a second cylindrical finishing portion 464 spaced apart axially along the length of the punch 460 from the first finishing portion 462 and having a second diameter greater than the first diameter.

The punch 460 is moved into engagement with the casting 12. The first cylindrical finishing portion 462 engages the first serrations 438 to deform the first serrations to form a finished, cylindrical first bearing support surface 466 on the casting 12. The bearing support surface 466 comprises the tops of the deformed serrations 438.

At the same time, the second cylindrical finishing portion 464 of the punch 460 engages the second serrations 440 to deform the second serrations to form a finished, cylindrical second bearing support surface 466 on the casting 12. The bearing support surface 468 comprises the tops of the deformed serrations 440. The two bearing support surfaces 466 and 468 are formed simultaneously by moving the single punch.

The single punch 460 is moved along the second axis 432, which is transverse (perpendicular) to the first axis 42. Thus, the bearing support surfaces of the housing part, which are centered on two transverse axes 42 and 432, are finished in one operation.

From the above description of the invention, those skilled in the art will perceive improvements, changes and modifications in the invention. Such improvements, changes and modifications within the skill of the art are intended to be covered by the appended claims.

Having described the invention, I claim:

1. A clutch/brake mechanism for a land vehicle having an engine, left and right drive wheels driven for rotation by the engine to move the vehicle in forward and reverse travel directions along a ground surface, left and right steerable wheels, and a steering actuator manually engageable by an operator of the vehicle and movable in left and right steering directions to effect steering movement of the left and right steerable wheels to control the direction of travel of the vehicle along a ground surface, said clutch/brake mechanism comprising:

left and right drums associated with the left and right drive wheels, respectively, and selectively connectable for rotation with the left and right drive wheels about a first axis;

a ring gear rotatable about said first axis for transmitting driving force from the engine to said left and right drums;

said left and right drums being independently movable independently of each other in a direction parallel to said first axis between (a) an engaged condition in which said ring gear transmits driving force from said ring gear to said drum, and (b) a disengaged condition in which said ring gear does not transmit driving force from said ring gear to said drum;

left and right drum engagement members associated with said left and right drums, respectively, said left and right drum engagement members being movable independently of each other relative to said left and right drums, respectively; and a mechanism responsive to movement of the steering actuator in one of the left and right steering directions for moving a selected one of said left and right drum engagement members to resist rotation of the drum associated with said selected drum engagement member and, thereby, to slow the rotational speed of the drive wheel associated with said selected drum.

2. A clutch/brake mechanism as set forth in claim 1 wherein said left and right drum engagement members comprise left and right bands associated-with and extending around said left and right drums, respectively, at a location radially outward of said drums, said left and right bands being radially contractible and expansible relative to said drums, and wherein said mechanism for moving a selected one of said left and right drum engagement members comprises a mechanism for contracting the selected one of said left and right bands to resist rotation of the drum associated with said selected band and, thereby, to slow the rotational speed of the drive wheel associated with said selected drum.

3. A clutch/brake mechanism as set forth in claim 2 wherein said selected band has first and second end portions joined by a roller assembly;

said mechanism for contracting the selected band comprises a band support member having a generally heart-shaped opening including a central portion and first and second legs extending from said central portion;

upon contraction of said band when the vehicle is moving in the forward travel direction, said roller assembly moving in said heart-shaped opening in a direction from said central portion into said first leg of said opening, the movement of said roller assembly causing further contraction of said band thereby providing a self-energizing effect to said mechanism for contracting the band;

upon contraction of said band when the vehicle is moving in the reverse travel direction, said roller assembly moving in said heart-shaped opening in a direction from said central portion into said second leg of said opening, the movement of said roller assembly causing further contraction of said band thereby providing a self-energizing effect to said mechanism for contracting the band.

4. A clutch/brake mechanism as set forth in claim 2 wherein each one of said left and right drums has a clutch surface and a separate braking surface, said clutch surfaces on said drums being engageable by said drum engagement members upon movement of said drum engagement members toward said drums in a first amount, said braking surfaces on said drums being engageable by said drum engagement members upon movement of said drum engagement members toward said drums in a second amount greater than said first amount.

5. A clutch/brake mechanism as set forth in claim 1 further comprising a self-energizing mechanism for said left and right drums that helps to actuate the engagement between said drums and said drive axles upon engagement of said clutch/brake mechanism.

6. A clutch/brake mechanism as set forth in claim 1 wherein said mechanism responsive to movement of the steering actuator comprises a steering bracket and a brake bracket, left and right actuator members extending from said steering bracket and brake bracket and connected with said left and right drum engagement members, respectively, said steering bracket being directly responsive to movement of said steering actuator to tension a selected one of said left and right actuator members, said brake bracket being responsive to movement of a braking actuator of the vehicle to tension both of said left and right actuator members.

7. A clutch/brake assembly as set forth in claim 1 for a vehicle having two axles driven for rotation by the clutch/brake mechanism about a common axis, and further comprising a housing;
    said housing enclosing and supporting said left and right drums, said ring gear, and said left and right drum engagement members;
    said housing also supporting said mechanism for moving a selected one of said left and right drum engagement members;
    said housing being a two-part split housing that is split in a direction parallel to or perpendicular to said first axis.

8. A clutch/brake mechanism for a land vehicle having an engine, left and right drive wheels driven for rotation by the engine to move the vehicle in forward and reverse travel directions along a ground surface, said clutch/brake mechanism comprising:
    left and right drums associated with the left and right drive wheels, respectively, and rotatable with the left and right drive wheels about a first axis;
    a ring gear rotatable about said first axis for transmitting driving force from the engine to said left and right drums;
    each one of said left and right drums being independently movable in a direction parallel to said first axis between (a) an engaged condition in which said ring gear transmits driving force from said ring gear to said drum, and (b) a disengaged condition in which said ring gear does not transmit driving force from said ring gear to said drum;
    each one of said left and right drums having a clutch surface and having a braking surface; and
    left and right drum engagement members associated with said left and right drums, respectively, said left and right drum engagement members being movable independently of each other toward said left and right drums, respectively;
    said clutch surface on said drum being engageable by said drum engagement member upon movement of said drum engagement member toward said drum in a first amount;
    said braking surface on said drum being engageable by said drum engagement member upon movement of said drum engagement member toward said drum in a second amount greater than said first amount.

9. A clutch/brake mechanism as set forth in claim 8 wherein said clutch surface is a different surface on said drum from said braking surface.

10. A clutch/brake mechanism as set forth in claim 8 wherein said left and right drum engagement members comprise left and right bands associated with and extending around said left and right drums, respectively, at a location radially outward of said drums, said left and right bands being radially contractible and expansible relative to said drums, and comprising a mechanism for contracting a selected one of said left and right bands to move the selected band into engagement with said clutch surface on said drum and, thereafter, into engagement with said braking surface on said drum.

11. A clutch/brake mechanism as set forth in claim 8 wherein said left and right drum engagement members comprise members movable axially relative to said drums to engage said drums and move said drums out of engagement with said ring gear, and comprising brake pad members engageable by said drums when moved axially for resisting rotation of said drums.

12. A clutch/brake mechanism as set forth in claim 11 comprising a ball clutch/brake mechanism for moving said left and right drum engagement members.

13. A land vehicle having an engine, left and right drive wheels driven for rotation by the engine to move the vehicle in forward and reverse travel directions along a ground surface, left and right steerable wheels, and a manually engageable steering actuator for effecting steering movement of the steerable wheels, said land vehicle comprising:
    left and right drums associated with the left and right drive wheels, respectively, and rotatable with the left and right drive wheels about a first axis;
    a ring gear rotatable about said first axis for transmitting driving force from the engine to said left and right drums;
    said left and right drums being independently movable in a direction parallel to said first axis between (a) an engaged condition in which said ring gear transmits driving force from said ring gear to said drum, and (b) a disengaged condition in which said ring gear does not transmit driving force from said ring gear to said drum;
    left and right bands associated with an extending around said left and right drums, respectively, at a location radially outward of said drums, said left and right bands being radially contractible and expansible relative to said drums; and
    a mechanism responsive to movement of the clutch actuator for contracting said left and right bands radially into engagement with said left and right bands to (a) move said left and right drums from the engaged condition toward the disengaged condition and simultaneously (b) resist rotation of said left and right drums thereby to slow the rotational speed of the left and right drive wheels.

14. A clutch/brake mechanism as set forth in claim 13 wherein both of said left and right drums continue to be positively driven independently of each other with no differential action in the event of decreased resistance from the ground surface to one of said left and right drive wheels.

15. A clutch/brake mechanism as set forth in claim 13 further comprising a directional control transmission assembly and a housing, said drums and said ring gear and said bands and said mechanism for contracting said bands and said directional control transmission assembly all being disposed in said housing and being provided as one assembled unit for assembly into the vehicle.

* * * * *